J. HAINES.
Cheese Cutter.
No. 56,212.
Patented July 10, 1866.
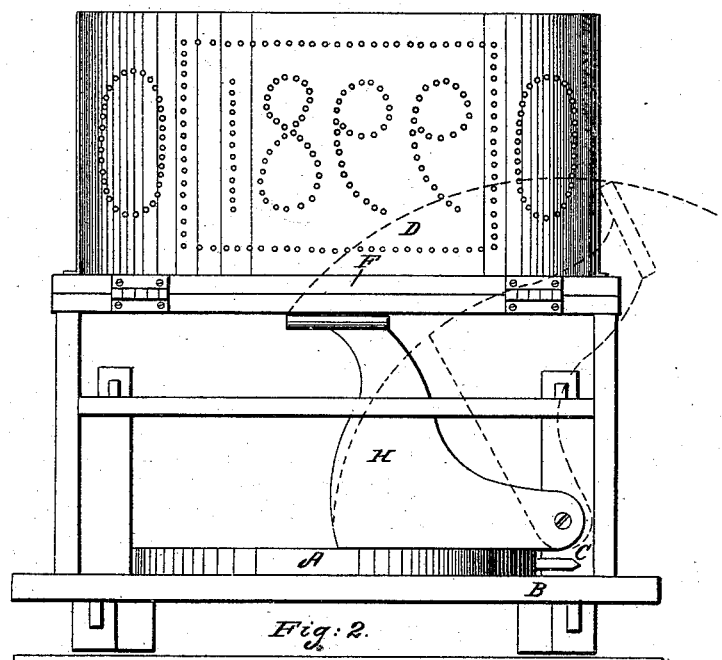
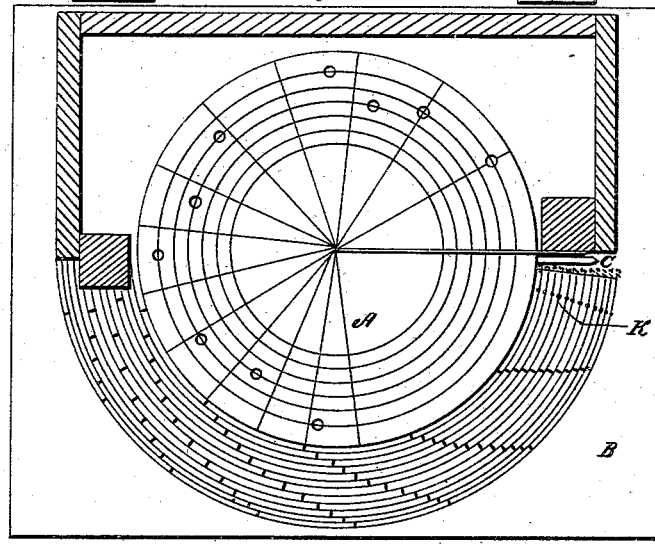
Witnesses:
Jas. L. Ewen
John A. Biedersheim
Inventor.
J. Haines.
By Munn & Co.
Attorneys.

UNITED STATES PATENT OFFICE.

JOEL HAINES, OF MIDDLEBURG, OHIO.

IMPROVEMENT IN CHEESE-CUTTERS.

Specification forming part of Letters Patent No. 56,212, dated July 10, 1866.

*To all whom it may concern:*

Be it known that I, JOEL HAINES, of Middleburg, in the county of Logan and State of Ohio, have made a new and useful Improvement in Cheese-Cutters; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a front elevation, the lid raised. Fig. 2 is a horizontal section on the line *a b*, Fig. 1.

The improvement consists of a device to enable pieces of a given weight to be cut from cheeses of different sizes and weights.

The cheese is supported upon a platform, which may be rotated at discretion. Around the edge of the platform are a series of semicircular graduations, whose divisions are calculated for different weights of cheese. An adjustable indicator on the platform is made to point toward the marks on a given scale, which indicate pounds and fractions with all requisite nicety. The cheese, of known weight, being placed concentrically upon the platform, the indicator is so adjusted that its point will reach the semicircle of graduations calculated for that weight of cheese. The pivoted knife is then brought down, making a radial cut into and through the cheese. The knife being then raised, the platform is rotated such proportion of a revolution as the piece required may bear to the whole weight. For instance, suppose the cheese to weigh forty pounds, a rotation of the platform of nine degrees will give a pound, or of forty-five degrees will give five pounds. If the cheese weighs thirty-six pounds, ten degrees will give a pound, &c.

The semicircular scales are furnished in sufficient number to include all the various sizes of cheeses within the usual limits, or such number as may fulfill the requirements of the case.

In the drawings, A is the platform. A number of circles marked thereon will facilitate setting the cheese concentrically, the platform, rotated at pleasure, being supported upon a central pivot in the bed-piece B, upon which are inscribed a number of concentric semicircles, which are so graduated as to indicate proportions of various whole numbers—as, for instance, the alternate numbers from fifteen to forty, or such others as may be required.

If required for a cheese of twenty pounds weight, the semicircle will be divided into two equal parts, with fractional divisions, if required. Other graduated semicircles are adapted for other weights.

The indicator C slips with all necessary freedom in and out of its socket in the periphery of the platform A, its end adjusted to the circle which represents the proportions of the cheese then on the platform.

The cover D protects the cheese, and the portion F is capable of being folded back to get at the same.

The knife H is pivoted to the side of the box, is vibrated downward, cutting radially through the cheese, and rotated out of contact therewith, as required.

The pin K marks the circle which agrees with the weight of the cheese when it is first laid on, so that if the indicator C be shifted accidentally the proper circle may be ascertained.

Having described my invention, what I claim therein as new, and desire to secure by Letters Patent, is—

The combination of the rotating platform provided with the adjustable indicator-point and the series of graduated arcs around the margin of the platform, substantially as and for the purpose described.

JOEL HAINES.

Witnesses:
W. F. HALL,
EDWARD H. KNIGHT.